Jan. 6, 1948. A. J. STOSICK 2,433,932
FUEL COMBUSTION
Filed March 11, 1944
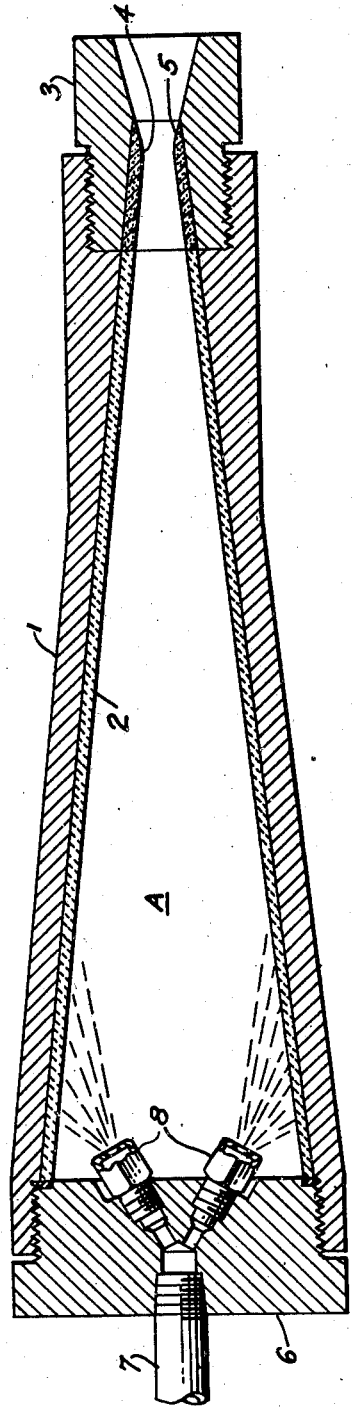
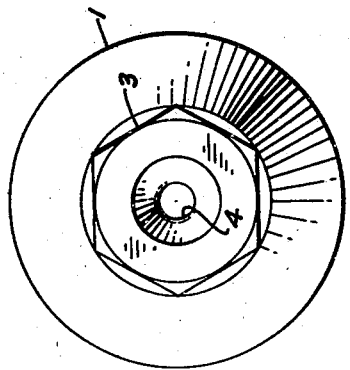
INVENTOR.
ARTHUR J. STOSICK
BY
Christie & Angus
ATTORNEYS Patented Jan. 6, 1948

2,433,932

UNITED STATES PATENT OFFICE 2,433,932

FUEL COMBUSTION

Arthur J. Stosick, Pasadena, Calif., assignor to Aerojet Engineering Corporation, Azusa, Calif., a corporation of Delaware Application March 11, 1944, Serial No. 526,065

9 Claims. (Cl. 52—5)

This invention relates to internal combustion motors and particularly to jet propulsion motors and to methods and substances used in their operation. The principal objects are to improve the operating performance of such motors and to simplify the equipment required in their operation.

In the operation of jet propulsion motors, fuel is usually burned in a combustion chamber and the gas formed from the combustion is released at high velocity through an exhaust nozzle to create the propelling force. The fuel and an oxidizer for it has heretofore been injected into the chamber and the fuel ignited by suitable means such as a flame or a catalyst. Nitroparaffins, and especially nitromethane or a mixture of nitromethane with nitroethane have been suggested in the copending application of Zwicky et al., Ser. No. 526,064, filed on the same date as this application, as a liquid fuel containing its own oxidizer. The catalysts heretofore used with them have needed to be heated, for example, to around 150° C. in order to fire the fuel. This has required the use of auxiliary heating apparatus which adds bulk and weight and increases the expense.

In accordance with my invention I provide a catalyst which will fire the fuel in the absence of oxygen without requiring to be preheated. The catalyst which I use for the purpose is an intimate mixture of finely divided semi-colloidal particles of manganese dioxide and other metal oxides. A mixture well adapted for the purpose is a mixture of the oxides of manganese, copper, cobalt, and silver, suitable proportions being 50% $MnO_2$, 30% $CuO$, 15% $Co_2O_3$, and 5% $Ag_2O$, by weight. It is not necessary to use all the other oxides with the manganese dioxide. For example, $MnO_2$ and $CuO$ alone might be used, satisfactory proportions being 60% $MnO_2$ and 40% $CuO$.

By the expression "finely divided" as used herein I mean having a diameter of 100 microns or less.

Cerium oxide may also be added to any of the foregoing mixtures, or the cerium oxide alone may be mixed with the manganese dioxide, preferably with a preponderance of the manganese dioxide.

These mixtures of finely divided oxides are generally known by the name "Hopcalite." I have found that hopcalites spontaneously initiate the decomposition of nitroparaffins.

It may in some cases be desirable to add to the hopcalites additional quantities of other oxides, preferably but not necessarily finely divided, for example, chromium oxide, thorium oxide, zirconium oxide, cerium oxide, magnesium oxide, uranium oxide, or mixture of some or all of them.

The catalysts contemplated by the invention may be used in other types of motors than jet motors and it will be understood that the invention is useful with other types of internal combustion engines.

In the drawing:

Fig. 1 is an elevation view in cross section of a jet propulsion motor in which my catalyst for the fuel may be used; and Fig. 2 is an end view of the motor.

The motor shown in the drawing comprises an elongated body portion 1, in the form of a long frustum of a cone having a lining 2 of suitable refractory material comprising or containing the catalyst according to this invention. The exhaust opening at the small end of the conical frustum terminates in a plug 3 having the usual constricted exhaust nozzle 4, and preferably a protective refractory lining 5, for example, carbon. The larger end of the conical member is closed by a plug 6, forming an enclosed combustion chamber A into which is led a pipe or passageway 7 preferably terminating in a number of spray nozzles 8. Liquid fuel is forced through pipe 7 under sufficient pressure to overcome the pressure in the combustion chamber A and sprayed onto the lining 2.

The lining 2 may be composed of a hopcalite or a mixture of a hopcalite with any one or more of the additional oxides, namely, $Cr_2O_3$, $ThO_2$, $ZrO_2$, $MgO$ in finely divided form. The mixture of these substances may be molded into the shape of the lining 2 as shown. Alternatively they can be molded into other shapes such as tubes, rods, honeycomb forms or other suitable shapes as may be desired. No heating elements are required to be used with the catalyst, as spontaneous combustion takes place at ordinary temperatures when the catalyst is sprayed with the nitroparaffin fuels of the type disclosed in the above-mentioned copending application of Zwicky et al., Ser. No. 526,064, filed on the same date as this application. These comprise the lighter nitroparaffins having in their molecular structure sufficient oxygen to produce their satisfactory combustion, especially nitromethane and a mixture of nitromethane with nitroethane.

My theory of the action of the catalysts according to my invention on these nitroparaffins is that the nitromethane, or such other nitroparaffin as may be used, undergoes adsorption on the catalyst. This probably releases a sufficient heat of adsorption to raise the temperature of the catalyst sufficiently to decompose the nitroparaffin. This probably explains why the catalyst should contain finely divided substances.

The advantage of using my catalysts with these fuels in accordance with my invention is apparent, particularly for use in airplane and the like, where the weight and space factor is very important. By their use the necessity for auxiliary heating apparatus is eliminated, resulting in simplification of the motor and attendant increased reliability.

I claim:

1. A method of spontaneously decomposing a member of the group consisting of nitromethane and a mixture of nitromethane with nitroethane in the absence of oxidizing agents outside of said member and without preheating, which comprises contacting said member with a catalyst composed of a mixture of manganese dioxide and a metal oxide taken from the group of metals consisting of chromium, thorium, zirconium, cerium, magnesium, uranium, copper, cobalt and silver.

2. A method of spontaneously decomposing a member of the group consisting of nitromethane and a mixture of nitromethane with nitroethane in the absence of oxidizing agents outside of said member which comprises contacting said member with a catalyst composed of a mixture of manganese dioxide and a metal oxide taken from the group of metals consisting of chromium, thorium, zirconium, cerium, magnesium, uranium, copper, cobalt and silver.

3. A method of spontaneously initiating the decomposition of nitromethane in the absence of any oxidizing agent outside of the nitromethane and without preheating which comprises contacting the nitromethane with a catalyst composed of a mixture of manganese dioxide and at least two metal oxides taken from the group of metals consisting of chromium, thorium, zirconium, cerium, magnesium, uranium, copper, cobalt, and silver.

4. A method of spontaneously initiating the decomposition of nitromethane in the absence of any oxidizing agent outside of the nitromethane and without preheating which comprises contacting the nitromethane with a catalyst composed of a mixture of manganese dioxide, copper oxide, cobaltic oxide, and silver oxide.

5. A method of spontaneously initiating the decomposition of nitromethane in the absence of any oxidizing agent outside of the nitromethane, and without preheating, which comprises contacting the nitromethane with a catalyst composed of 50% manganese dioxide, 30% copper oxide, 15% cobaltic oxide and 5% silver oxide by weight.

6. A method of spontaneously initiating the decomposition of a mixture of nitromethane and nitroethane in the absence of any oxidizing agent outside of said mixture and without preheating which comprises contacting the mixture of nitromethane and nitroethane with a catalyst composed of about 50% manganese dioxide, 30% copper oxide, 15% cobaltic oxide and 5% silver oxide by weight.

7. A method of spontaneously decomposing a mixture of nitromethane and nitroethane in the absence of oxidizing agents outside of said mixture and without preheating, which comprises contacting the mixture of nitromethane and nitroethane with a catalyst composed of a mixture of manganese dioxide and a metal oxide taken from the group of metals consisting of chromium, thorium, zirconium, cerium, magnesium, uranium, copper, cobalt and silver.

8. A method of spontaneously decomposing nitromethane in the absence of oxidizing agents outside of said nitromethane and without preheating which comprises contacting the nitromethane with a catalyst composed of a mixture of manganese dioxide and copper oxide.

9. A method of spontaneously decomposing a member of the group consisting of nitromethane and a mixture of nitromethane with nitroethane in the absence of oxidizing agents outside of said member and without preheating which comprises contacting the said member with a catalyst composed of a mixture of about 60% $MnO_2$ and 40% $CuO$.

ARTHUR J. STOSICK.

REFERENCES CITED

The following references are of record in the file of this patent:

UNITED STATES PATENTS

| Number | Name | Date |
|---|---|---|
| 1,824,078 | Fischer | Sept. 22, 1931 |
| 1,345,323 | Frazer | June 29, 1920 |
| 1,422,211 | Lamb | July 11, 1922 |
| 2,061,470 | Larson | Nov. 17, 1936 |
| 1,357,000 | Piggott | Oct. 26, 1920 |
| 1,562,480 | Wietzel et al. | Nov. 24, 1925 |
| 2,040,782 | Van Peski | May 12, 1936 |

FOREIGN PATENTS

| Number | Country | Date |
|---|---|---|
| 459,924 | Great Britain | Jan. 18, 1937 |
| 271,899 | Great Britain | Aug. 18, 1927 |

OTHER REFERENCES

Grant, "Hachk's Chemical Dictionary", third ed., 1944.